United States Patent [19]

Nishijima et al.

[11] 4,452,859
[45] Jun. 5, 1984

[54] BAKING AND COOKING TRAY SHEET AND ITS MANUFACTURING METHOD

[75] Inventors: Masayuki Nishijima, Tokorozawa; Morimasa Koizumi, Yokohama; Minoru Matsuda, Komatsushima, all of Japan

[73] Assignee: Sanyo-Kokusaku Pulp Co., Ltd., Tokyo, Japan

[21] Appl. No.: 296,303

[22] Filed: Aug. 26, 1981

[30] Foreign Application Priority Data

Sep. 2, 1980 [JP] Japan ................... 55-120606

[51] Int. Cl.³ .............................. B32B 3/26
[52] U.S. Cl. ........................ 428/340; 428/451; 428/514; 426/13; 426/27; 426/415; 426/523; 229/3.1; 220/458; 220/417; 220/418
[58] Field of Search ............... 428/451, 447, 511, 340, 428/352, 514, 537; 426/13, 27, 415, 523; 229/3.1; 220/458, 417, 418

[56] References Cited

U.S. PATENT DOCUMENTS 4,066,817 1/1978 Rossi .................... 428/451
4,304,815 12/1981 Cugasi .................. 428/511

FOREIGN PATENT DOCUMENTS 973653 9/1975 Canada .................... 428/511

Primary Examiner—George F. Lesmes
Assistant Examiner—E. Rollins Buffalow
Attorney, Agent, or Firm—Oblon, Fisher, Spivak, McClelland & Maier

[57] ABSTRACT

A baking and cooking tray sheet comprises a base stock of neutral paper or cardboard weighing 150 to 500 g/m² on the dry basis, and a barrier layer provided thereon and composed mainly of a polyvinyl alcohol and/or starch and a water-resisting agent. A coating layer of silicone resin is further applied on the barrier layer. The tray sheet should have a water vapor permeability of greater than 100 g/m² for 24 hours and an air permeability of greater than 5,000 seconds. The tray sheet is prepared by the steps of coating one or both sides of the base stock with a coating liquid composed mainly of a polyvinyl alcohol and/or starch and a water-resisting agent, followed by drying, and of applying one side of the resultant sheet with a coating liquid of silicone resin, followed by drying.

1 Claim, 5 Drawing Figures

BAKING AND COOKING TRAY SHEET AND ITS MANUFACTURING METHOD

BACKGROUND OF THE INVENTION

The present invention relates to a baking and cooking tray which is adapted to accommodate an amount of dough for bread, pound cakes or the like and to be placed directly in conventional ovens or microwave ovens for baking and cooking. This tray is also applicable to the cooking of liquid or soggy foodstufs such as stew and gratin. The present invention covers a method of the manufacturing of such a tray as well.

In general, bread and cake products are prepared by placing their dough on a salamander which is then fed in an oven heated at 150 to 250° C. for baking. The salamander is usually formed of an endless belt or a steel-made, shallow vessel which needs to be coated in advance with oils and fats to avoid scorching during baking. Upon being subjected to repeated baking, however, the oils and fats are carbonized to form a film which is troublesome to remove, and may soil the underside of foodstuff and deteriorate it. Trays formed of aluminuim or laminated with aluminium foils, methylpentene or PET have recently been proposed with a view to eliminating the aforesaid drawbacks and simplifying the production line. However, none of these trays are satisfactory in the removing of foodstuff. The aluminium tray excels in heat resistance, but has a serious disadvantage that it cannot be used with microwave ovens. The tray laminated with heat resistant resin such as methylpenten or PET has only a certain of heat resistance and cannot be used in prolonged cooking at high temperatures, since the laminated film layer is so poor in water vapor permeability that the water content of the base paper is lost, resulting in the paper scorching and sticking to the outer face of foodstuff.

SUMMARY OF THE INVENTION

It is therefore a main object of the present invention is to provide a tray which permits easy recovery of the cooked foodstuff, excels in heat resistance, and can be used not only with conventional ovens also microwave ovens.

BRIEF DESCRIPTION OF THE DRAWINGS

The present invention will be explained in details with reference to the attached drawings, in which.

DETAILED DESCRIPTION OF THE INVENTION

Figure 1:
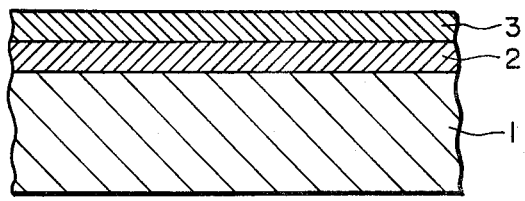
FIG. 1 is a cross section of the tray according to the present invention.

Referring now to FIG. 1, there is shown a baking and cooking tray sheet (hereinafter called the baking tray) comprising a laminated body obtained by coating a base stock 1 of paper with a barrier layer 2, followed by coating of a release layer 3.

The base stock 1 is composed of neutral paper weighing 150 to 500 g/m² on the dry basis. The barrier layer 2 is formed by applying the layer 1 with a coating agent composed mainly of polyvinyl alcohol (PVA) and/or starch and water-resisting agent in an amount of 1 to 10g/m² on the dry basis. The release layer 3 is formed by coating on the layer 2 with silicone resin in an amount of 0.5 to 5 g/m² on dry basis. From this sheet is prepared a tray for baking and cooking, the size and shape of which can be varied depending upon the purpose.

The baking tray according to the present invention has the following characteristic features:

(1) It can be used with both conventional ovens and microwave ovens.

(2) It excels particularly in water vapor permeability. Hence, the paper layer always retains some amount of water that assures good heat resistance, since the steam resulting from the foodstuff being cooked permeates through the paper layer. (At the same time, the cooking time can be reduced).

(3) It permits easy removal of the cooked foodstuff without sticking thereto. Hence, the thus recovered foodstuff remains in the desired form.

The above-mentioned features makes the tray of the present invention suitable for commercial or home use. Among others, the tray of the present invention is first characterized in that it has a barrier layer composed of a water-soluble high molecular substance such as starch or PVA and excelling in water vapor permeability, the oil- and water-resisting properties thereof being further increased by the addition of a water-resisting agent.

The water-soluble high molecular substance such as starch or PVA has been used as a barrier coating agent in the production of ordinary release paper. In the cooking field to which the present invention belongs, however, the addition of such a water-resisting agent is a vital importance.

The PVA and starch used in the present invention includes, for instance, PVA 117 and PVA 105 made by Kuraray Co., Ltd., and SIZER 700 and SIZER 600 made by Ajinomoto Co., Ltd. A variety of modified PVA and starch may also be used, however.

The water-resisting agent used, which sould be of edibility, includes GLYOXAZAL made by Nippon Synthetic Chemical Co., Ltd., SUMIREZE 633 polyamide resin, made by Sumitomo Chemical Co., Ltd., and EPINOX P-7009Y made by Dick Hercules Co., Ltd. However, the present invention is not limited to these agents.

The amount of the water-resisting agent added varies dependent upon the type thereof and the kind of the food cooked, and should preferably be in a range of 5 to 30% by weight to the dry weight of starch or PVA. The concentration and amount of the coating liquid in the barrier layer vary with the types of the base stock and chemicals used as well as the coating method and the purpose, and are preferably 5 to 15% by weight and 1 to 10 g/m² (dry basis). The minimum coating weight is determined by a permeability of greater than 5,000 seconds. In the case of less coating weight, the number of pin holes is increased accordingly oil permeations are increased. This render the appearance of the tray unattractive and entails a lowering of the release properties thereof. A greater amount of the coating liquid provides a more complete barrier layer having an increased air permeability. However, use of the coating liquid in an amount more than required entails a lowering of water vapor permeability, and is wasteful.

In view of heat resistance, it is essential that the base stock is of neutral paper nature. Referring to the amount of the base stock applied, its lower limit is 150 g/m² with the strength of the resultant tray in mind, while its upper limit is preferably 500 g/m² since, in a quantity exceeding that value, some problems arise in connection with the molding and heat resistance of the tray, and scorching of the outer face of the tray takes place. It is here noted that the term "neutral paper" is used to indicate paper having a pH value, 5.5 to 10.0 as measured by the hot water extraction method specified by JIS P 8133.

Commercially available silicone resin, for example, SRX-244 and PRX-801 manufactured by Toray Silicone Co., Ltd. are applicable as the release agent. Commercial product SH3170K or SRX-216 manufactured by the same firm are applicable as catalyst as well. However, the present invention is not limited to these products, and can use most of silicone of solvent, emulsion and non-solvent type.

The quantity and concentration of the coating liquid vary with the coating method applied, and should preferably be beween 0.5 and 5 g/m² (dry basis), 3 and 10% by weight, respectively.

In this connection, it is noted that the silicone provides a coated film having no substantial influence of air- and water vapor-permeability.

The effect of the water resisting agent added will now be explained on the basis of the experimental results of these chemicals.

In the layer construction as shown in FIG. 1, 300 g/m² of neutral paper was used as the base stock, silicone resin coated with 1 g/m² (dry basis) of the aforesaid SRX-244 as the release layer, and a layer obtained by coating of 2 g/m² (dry basis) of the following (a) or (b) as the barrier layer. (a) PVA 117 added with a water resisting agent GLYOXAZAL in a ratio of 100: 10

(b) PVA 117

The obtained two tray sheets were compared with each other with respect to their properties. The results are set forth in Table 1 in which the experimental results of a commercial product are also shown for the purpose of comparison. From Table 1, it is found that the three sheets are largely different with one another in oil- and water- resisting properties. In fact, the cooked pound cake could be recovered more easily from the tray sheet containing a given amount of the water resisting agent.

the tray was counted. According to this test, there was little or no difference in the number of oil spots between (a) and (b), when the tray was cleared of no content or contained salad oil. However, (b) carried a by far increased number of oil spots, when the tray contained water or a water/salad oil mixture.

Film having a thickness of about 30 microns and a weight of about 1 g/m² were prepared from both coating liquids (a) and (b). These films were immersed in hot water of 60° C. for one hour, and their solubilities were determined from the weight of the undissolved parts. The results indicated that the film consisting of PVA alone is completely dissolved, while the film consisting of a combination of PVA and a water resisting agent shows a solubility of only 7.3%.

An amount of dough for pound cakes was charged in a 60 mm × 60 mm × 35 mm test tray, which was then placed in an electric oven where it was heated at 180° C. for 15 minutes. There was a considerable difference in the release properties (expressed in terms of a ratio of the area of the released pound cake relative to the total area thereof) of the underside of the baked pound cake between the tray having a water resisting agent- containing barrier layer and that having a water resisting agent-free barrier layer. In fact, it was virtually impossible to release the pound cake from the tray having a water resisting agent-free barrier layer. There was also a rather large difference in air permeability (measured by JAPAN TAPPI paper testing No.5) between both trays. The air permeabilities were measured of unused tray sheets as well as tray sheets heated at 200° C. in an conventional oven for 10 minutes and steam-heated at 100° C. in a steam oven for 20 minutes.

From the experimental results, it has turned out that most of foodstuffs contain water and oil contents, and the water content passes into a water vapor in the heating process which, in turn, permeates through the sheet. If the barrier layer is lacking in water resistance, pin holes are then formed, resulting in deterioration of the release properties and increases in the amount of oil permeating through the tray. Such a tray does not fulfill its own function. Referring now to the comparison example, it has sufficient water resistance due to the presence of a water resisting resin coating. However, it

TABLE 1

|  |  | (a) PVA layer containing water-resisting agents | PVA layer | Comparative Ex 1 a commercial product containing nitrocellulose |
|---|---|---|---|---|
| water-and oil-resistance (the number of oil spots) 1/25 cm² | (I) No content | 0 ~ 2 | 0 ~ 2 | 30 ~ 50 |
|  | (II) Salad oil | 0 ~ 2 | 0 ~ 2 | 5 ~ 10 |
|  | (III) water and salad oil (5:5) | 0 ~ 3 | 10 ~ 27 | 5 ~ 10 |
|  | (IV) water | 0 ~ 3 | 17 ~ 32 | 5 ~ 10 |
| Solubility of film (%) (60° C., one hour immersion |  | 7.3 | 100 | — |
| Air permeability Blank |  | 7,000 | 6,800 | 18,000 |
| 1 (sec) after Steam-heating |  | 6,400 | 800 | 15,000 |
| after heating |  | 6,700 | 6,400 | 150 |
| Release Properties Pound cakes (%) |  | 95 ~ 100 | 0 ~ 5 | 60 ~ 70 |

The water- and oil- resisting test was carried out as follows: 108 of each of the products specified in the table was charged in a 50mm × 50mm × 10mm test tray, which was placed in an electric oven maintained at 200° C. for 10-minute heating. The tray was then cleared, and put 10 g of fresh salad oil, leave it for 10 minutes. Subsequently, the number of salad oil spots formed on is poor in barrier properties and heat resistance so that a lowering of air permeability takes place with resulting formation of a number of pin holes. It also renders the recovery of foodstuff difficult.

Accordingly, the baking tray should essentially be of heat resistance and water resistance. It is of vital importance that the air permeability of the tray sheet is greater than 5,000 seconds after the heat treatment, as is the case with the present sheet.

To demonstrate that the baking tray according to the present invention excels in both water vapor permeability and release properties, a pound cake and a steamed bread were prepared in an electric oven (180° C., 20 minutes) and a steam oven (100° C., 20 minutes), using a commercial tray and a comparison sample in which a base stock is coated with vinylidence chloride resin having a poor water vapor permeability. The results are shown in Table 2.

case, no moisture stocks to the bottom and sides of bread, so that the bread can be released more easily from the tray.

3. The high water vapor permeability of the tray according to the present invention assures uniform baking of foodstuff, and permits the sheet to carry suitable water retention in the high-temperature cooking process. Hence, it is possible to restrain rises in the temperature of the tray itself. The tray is also superior in heat resistance to conventional film-laminated trays.

4. Due to the presence of the high heat resistant materials, the tray according to the present invention excels

TABLE 2

Figure 2:
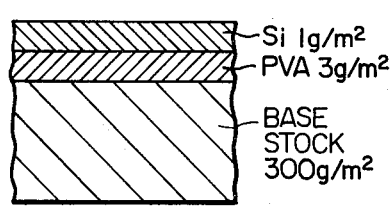
FIG. 2 is an illustrative view of the section of the tray outlined in Table 2.
Figure 3:
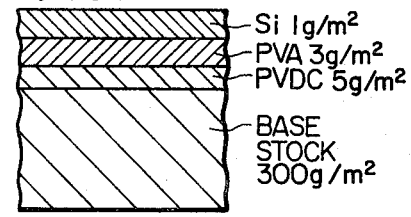
FIGS. 3 to 5 are illustrative views of Comparison Examples 2 to 4 outlined in Table 2.
Figure 4:
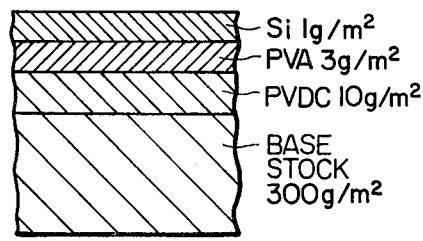
Figure 5:
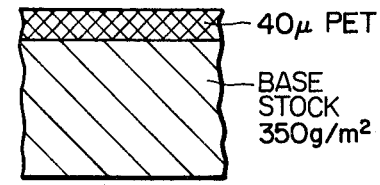

|  | Tray (Invented) | Comparative Ex. 2 Vinylidene coating (a) | Comparative Ex. 3 Vinylidene coating (b) | Comparative Ex. 4 PET-laminated tray | Comparative Ex. 5 Aluminium tray |
|---|---|---|---|---|---|
| Release properties pound cakes (%) | 90 ~ 100 | 90 ~ 100 | 90 ~ 100 | 0 ~ 10 | 0 |
| Release properties steamed bread (%) | 95 ~ 100 | 90 ~ 100 | 60 ~ 80 | 0 ~ 20 | 0 ~ 10 |
| Stickiness of the bottom of steamed bread | not found | not found | slightly found | found | found |
| Scorching of the tray's outer face after cooking | not found | not found | slightly found | found |  |
| water-vapor permeability (g/m$^2$, 24 hr) | 650 | 90 | 29 | 14 | 0 |
| Air permeability (Sec.) | 50,000< | 50,000< | 50,000< | 50,000< | 50,000< |
| Peel strength of adhesive tape (g/20 mm) | 20 | 21 | 18 | Peeling was impossible | Peeling was impossible |
| Remarks | FIG. 2 | FIG. 3 | FIG. 4 | Commercial product FIG. 5 | Commercial product Thickness: 90 microns |

The trays were used 90×90×35 mm in size and contained 100 g of foodstuff. The water vapor permeability was measured according to JIS Z-0208-1973 (the cup type water vapor permeability test for moistureproof packing materials).

The vinylidene resin used was SALANE LATEX L-504 manufactured by Asahi Dow Co., Ltd.

As will be understood from Table 2, the baking tray according to the present invention has improved release properties corresponding to the peel strength of an adhesive tape due to the presence of a silicone coating layer. Accordingly, the baked food product can be recovered more easily from the tray.

In case of (a) and (b) having a reduced water vapor permeability, there is a difference in the release properties of bread and the stickiness of the underside of bread. This turns out that the water vapor permeability has an influence on the release properties and the scorching of the outer face of the tray.

A comparison of the baking tray according to the present invention with commercial trays arrives at the following conclusions:

1. The commercial trays show a degree of release properties with respect to foodstuffs whose outer faces are relatively hard, such as bread. However, the tray according to the present invention is more preferable for use in porous and crumbly foodstuffs rich in sugar, such as pound cakes, due to the presence of a silicone coating layer.

2. Because of its good water vapor permeability, the tray according to the present invention is also applicable to bread products prepared by steam heating. In this in heat resistance. Besides, it can be used with both conventional ovens and microwave ovens due to the absence of metals, such as, aluminium.

5. The tray according to the present invention stands comparison with conventional film-laminated trays in waterproofness and water resistance, although it shows a certain of water vapor permeability. Therefore, it can be used for the cooking of soggy foodstuffs such as stew and gratin.

6. PVA and starch by nature excel in oil resistance, and provide an excellent barrier layer having a pin hole-free film. Accordingly, the tray according to the present invention is also equivalent to conventional film-laminated trays in the oils and fats permeation-preventing effect.

7. The price of PET or methylpenten resin used in conventional film-laminated trays rises with increases petroleum costs. In addition, the film to be laminated should be 20 to 40 microns in thickness. Such a laminating process involves troublesome steps. However, the tray according to the present invention can be prepared from inexpensive materials with existing coating equipment, and is therefore economical and profitable. Besides, the tray according to the present invention can easily be disposal by, for instance, burning.

As above mentioned, it is concluded from a comparison of the tray according to the present invention with conventional trays that the former has all the features that are required for the cooking of foodstuffs.

The present invention will now be explained with reference to the following non-restrictive examples.

EXAMPLE 1

A base stock of neutral paper 300 g/m² on the dry basis were coated on its one side with about 5 g/m² (dry basis) of a 15% solution of 100 parts by weight (dry) of oxidized starch, SIZER-600, added with 20 parts by weight (dry) of a water-resisting agent, SUMIREZE633 (based on polyamides, 30%) by air knife coater. Further, a toluene solution having a silicone resin—PRX-801—content of 7% by weight was incorporated with a catalyst—SH3170K—in a solid ratio of 5%. About 3 g/m² (dry basis) of the resultant solution were coated onto the barrier layer by air knife coater. The obtained sheet had then a water vapor permeability of 620 g/m², 24 hr, and an air permeability of 20,000 seconds. A 150×100×20 mm tray was prepared from this sheet. Pound cake dough rich in sugar was put on this tray which was then placed in a conventional oven of 180° C. for 15-minute cooking. The thus prepared cakes were uniformly baked, and could be released completely from the tray without leaving any crumb thereon. The tray had no sign of any oil spots, keeping original shape, and could be re-used.

COMPARATIVE EXAMPLE 1

Using a base stock of ordinary (acidic) paper having a pH value of 3.8 and weighing 300g/m² on the dry basis, a control sample was prepared by the same manner of Example 1. The thus prepared sample has a water vapor permeability of 600 g/m², 24 hr, and an air permeability of 15,000 seconds.

From this sample was prepared a tray similar to that in Example 1. The cooking was conducted under the same conditions as in Example 1. As a result, it was found that while no problem arises in connection with the baking and release properties of the obtained cake, the tray turns brown to a considerable extent with a part of its bends being torn due to thermal deterioration.

EXAMPLE 2

Using the base stock and materials employed in Example 1, a barrier layer was likewise prepared. On this layer were coated about 2 g/m² (dry basis) of a 8% coating liquid obtained by mixing silicone resin—KM-763 (emulsion type, 30%) manufactured by Shinetsu Chemcical Co., Ltd.—with a catalyst—C-PM-4P manufactured by the same firm—in a mixing ratio of 100:10.

From the sheet was prepared a tray similar to that in Example 1. An amount of dough was put in this tray which was then placed in an conventional oven of 250° C. for 15-minute cooking. The uniformly baked bread could be released completely from the bottom of the tray, but the tray showed no scorching.

EXAMPLE 3

A base stock of neutral paper 200 g/m² on the dry basis was coated on its either side with about 2 g/m² (dry basis) of a 7% solution obtained by mixing of 80 parts by dry weight of PVA 117 (completely saponified PVA, polymerization degree of 1700) manufactured by Kuraray Co., Ltd., 20 parts by dry weight of oxidized starch—SIZER—600—, and 15 parts by dry weight of a water—resisting agent—GLYOXAZAL (40% aqueous solution)—.

About 3 g/m² (dry basis) of the same coating liquid as used in Example 1 were further coated as the silicone resin. The resultant sheet had then a water vapor permeability of 480 g/m², 24 hr, and an air permeability of 45,000 seconds.

From this sheet was prepared a 60×90×50 mm tray. 100 grams of dough were put in this tray which was then placed in a steam oven of 100° C. for 15-minute cooking. The thus steamed bread was uniformly baked, and showed on stickness at its bottom. Therefore, the bread could be released completely from the tray. The tray retained its original shape, and underwent no deformation due to water residues.

For the purpose of comparison, a similar sheet was prepared from cardboard having a weight of 135 g/m² on the dry basis. During cooking, the longer side of a tray prepared from this sheet was largely bent with resulting deformation of its content.

EXAMPLE 4

A base stock of neutral paper weighing 400 g/m² on the dry basis were coated on its one side with about 3 g/m² (dry basis) of a 10% solution obtained by mixing of 100 parts by dry weight of PVA 105 (completely saponified PVA, polymerization degree of 500) manufactured by Kuraray Co., Ltd., and 30 Parts by dry weight of SUMIREZE 633. About 2 g/m² (dry basis) of the silicone coating liquid as used in Example 1 were further coated.

From the sheet was a 160×90×30 mm tray. A commercial product of macaroni gratin was put in this tray which was then placed in an conventional oven of at most 250° C. for 25-minute cooking.

The thus prepared product had its surface layer scorched nicely, and its bottom and sides remaining unburned.

The tray remained excellent and retained its original shape at high temperatures for prolonged periods, and could be re-used upon washing.

What is claimed is:

1. A baking and cooking tray sheet comprising a base stock of neutral paper or cardboard weighing 150 to 500 g/m² on the dry basis, a barrier layer provided thereon and consisting essentially of a polyvinl alcohol and/or starch and a water-resisting agent, and a coating layer of silicone resin provided on the barrier layer, the sheet having a water vapor permeability of greater than 100 g/m², 24 hours as measured according to JIS and an air permeability of greater than 5,000 seconds as measured after 10 minute heat treatment at 200° C. and after 20-minute heat treatment at 100° C., according to the TAPPI paper testing method.

* * * * *